United States Patent
Manula et al.

(10) Patent No.: US 9,191,452 B2
(45) Date of Patent: Nov. 17, 2015

(54) METHOD AND SYSTEM FOR AN ON-CHIP COMPLETION CACHE FOR OPTIMIZED COMPLETION BUILDING

(71) Applicant: Oracle International Corporation, Redwood Shores, CA (US)

(72) Inventors: Brian Edward Manula, Oslo (NO); Magne Vigulf Sandven, Ski (NO); Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 505 days.

(21) Appl. No.: 13/721,765

(22) Filed: Dec. 20, 2012

(65) Prior Publication Data

US 2014/0181241 A1    Jun. 26, 2014

(51) Int. Cl.
G06F 15/16 (2006.01)
H04L 29/08 (2006.01)
H04L 12/931 (2013.01)
G06F 12/00 (2006.01)

(52) U.S. Cl.
CPC ...... H04L 67/2842 (2013.01); H04L 29/08072 (2013.01); H04L 49/358 (2013.01); H04L 67/1097 (2013.01)

(58) Field of Classification Search
USPC .................. 709/203, 217–218, 223–229, 250
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,136,353 B2 | 11/2006 | Ha et al. | |
| 7,330,918 B2 | 2/2008 | Yamamoto et al. | |
| 7,496,698 B2 | 2/2009 | Biran et al. | |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,899,050 B2 | 3/2011 | Craddock et al. | |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 8,635,619 B2 * | 1/2014 | Auernhammer et al. | 718/102 |
| 8,640,135 B2 * | 1/2014 | Auernhammer et al. | 718/102 |
| 2001/0036185 A1 | 11/2001 | Dempo | |

(Continued)

*Primary Examiner* — Zarni Maung
(74) *Attorney, Agent, or Firm* — Osha Liang LLP

(57) ABSTRACT

A method for optimizing completion building is disclosed. The method involves receiving a work request by a host channel adapter (HCA), caching a portion of the work request in a completion cache in the HCA, wherein the cached portion of the work request includes information for building a completion for the work request, receiving, by the HCA, a response to the work request, querying the completion cache upon receiving the response to the work request to obtain the cached portion of the work request, and building the completion for the work request using the cached portion of the work request, wherein the completion informs a software application of at least a status of the work request as executed by the HCA.

20 Claims, 5 Drawing Sheets

(56) References Cited

U.S. PATENT DOCUMENTS

| | | |
|---|---|---|
| 2003/0101158 A1 | 5/2003 | Pinto et al. |
| 2005/0018669 A1 | 1/2005 | Arndt et al. |
| 2005/0060443 A1 | 3/2005 | Rosner |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2011/0131581 A1* | 6/2011 | Auernhammer et al. ..... 718/102 |
| 2011/0216648 A1 | 9/2011 | Mehrotra et al. |
| 2012/0239832 A1 | 9/2012 | Subramanian et al. |
| 2014/0177633 A1* | 6/2014 | Manula et al. ................ 370/392 |

* cited by examiner

METHOD AND SYSTEM FOR AN ON-CHIP COMPLETION CACHE FOR OPTIMIZED COMPLETION BUILDING

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made up of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair includes a send queue and a receive queue. Specifically, in order for a process to send a message to another process, the process posts the message to the send queue. The host channel adapter sends the message in the form of packets to the channel adapter having the receive queue. Each packet that is sent may include a packet sequence number. Logic associated with the receive queue ensures that packets are processed in a particular order using the packet sequence number.

Infiniband® supports operations such as remote direct memory access (RDMA) read and write operations and reliable connections. Specifically, a requesting process may send a request in the message for the receiver to store data and/or return data. In response, the remote node's channel adapter includes functionality to store and/or return the requested data to the requesting process.

In network communications, reliable connections (both for remote copying and extended remote copying) are implemented by the requester having an acknowledgement when a packet is successfully transmitted or having a timeout if an acknowledgement is not received within a fixed programmable time after a packet is sent. When an acknowledgement is received by the requestor, the requestor must 'complete' the request by writing required data to a completion queue in main memory. The data for the completion is obtained from the send queue of the corresponding queue pair (QP). A completion is written to the completion queue in order to provide a user with information about the send request. In the event that packet transmission is not successful, after the timeout period has elapsed, the initial transmission is followed by packet retransmission, where duplicated packets are ignored by the responder. Once a timeout for a given request packet is detected, the requester may retry the request.

SUMMARY

In general, in one aspect, the invention relates to a method for optimizing completion building, the method comprising receiving a work request by a host channel adapter (HCA), caching a portion of the work request in a completion cache in the HCA, wherein the cached portion of the work request comprises information for building a completion for the work request, receiving, by the HCA, a response to the work request, querying the completion cache upon receiving the response to the work request to obtain the cached portion of the work request, and building the completion for the work request using the cached portion of the work request, wherein the completion informs a software application of at least a status of the work request as executed by the HCA.

In general, in one aspect, the invention relates to a host communication adapter (HCA) comprising transmitting processing logic configured to transmit a work request issued by a software application executing on a host operatively connected to the HCA, and cache a portion of the work request in a completion cache, wherein the cached portion of the work request comprises information for building a completion for the work request, responder processing logic configured to receive the work request from the transmitting processing logic, and generate a response to the work request, and a completion module configured to receive the response to the work request from the responder processing logic, and build the completion for the work request, wherein the completion informs the software application of at least a status of the work request as executed by the HCA.

In general, in one aspect, the invention relates to a system, comprising a host executing a software application, wherein the software application is configured to issue a work request, and a host communication adapter (HCA) operatively connected to the host and configured to receive the work request, cache a portion of the work request in a completion cache in the HCA, wherein the cached portion of the work request comprises information for building a completion for the work request, process the work request and generate a response to the work request, and build the completion for the work request using the cached portion of the work request, wherein the completion informs the software application of at least a status of the work request as executed by the HCA.

Other aspects of the invention will be apparent from the following description and the appended claims.

DETAILED DESCRIPTION

Figure 1:
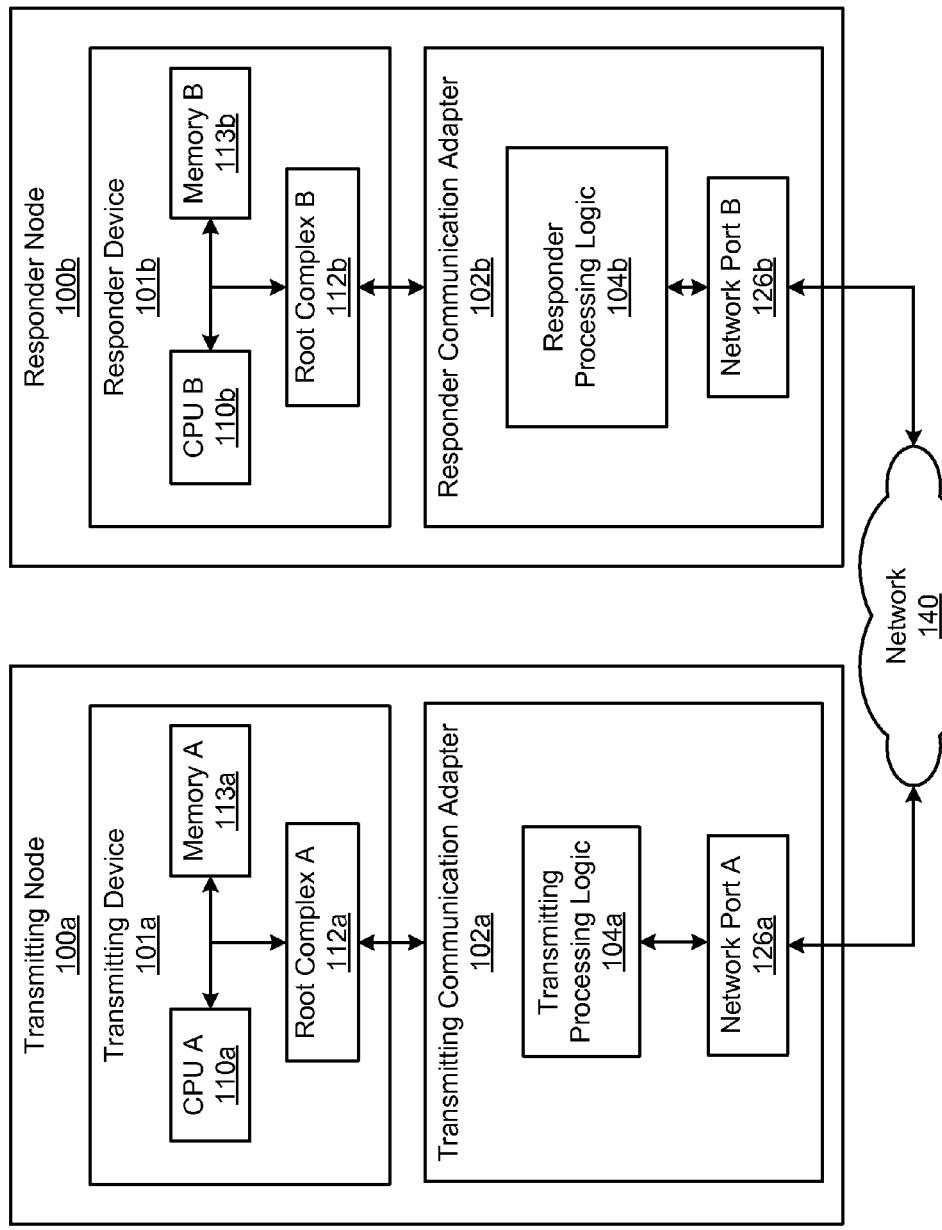
FIGS. 1-2 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and a system for optimized completion building. Specifically, one or more embodiments of the invention provide a completion cache implemented in hardware (on-chip) for efficient completion building by a host channel adapter (HCA) using reliable connections for a send request submitted by a software application.

FIG. 1 shows a schematic diagram of a communication system in one or more embodiments of the invention. In one or more embodiments of the invention, the communication system includes a transmitting node (100a) and a responder node (100b). The transmitting node (100a) and responder node (100b) may be any type of physical computing device connected to a network (140). The network may be any type of network, such as an Infiniband® network, a local area network, a wide area network (e.g., Internet), or any other network now known or later developed. By way of an example of the transmitting node (100a) and the responder node (100b), the transmitting node (100a) and/or a responder node (100b) may be a host system, a storage device, or any other type of computing system. In one or more embodiments of the invention, for a particular message, the transmitting node (100a) is a system that sends the message and the responder node (100b) is a system that receives the message. In other words, the use of the words, "transmitting" and "responder", refer to the roles of the respective systems for a particular message. The roles may be reversed for another message, such as a response sent from responder node (100b) to transmitting node (100b). For such a message, the responder node (100b) is a transmitting node and the transmitting node (100a) is a responder node. Thus, communication may be bi-directional in one or more embodiments of the invention.

In one or more embodiments of the invention, the transmitting node (100a) and responder node (100b) include a device (e.g., transmitting device (101a), responder device (101b)) and a communication adapter (e.g., transmitting communication adapter (102a), responder communication adapter (102b)). The device and the communication adapter are discussed below.

In one or more embodiments of the invention, the device (e.g., transmitting device (101a), responder device (101b)) includes at least a minimum amount of hardware necessary to process instructions. As shown in FIG. 1, the device includes hardware, such as a central processing unit ("CPU") (e.g., CPU A (110a), CPU B (110b)), memory (e.g., memory A (113a), memory B (113b)), and a root complex (e.g., root complex A (112a), root complex B (112b)). In one or more embodiments of the invention, the CPU is a hardware processor component for processing instructions of the device. The CPU may include multiple hardware processors. Alternatively or additionally, each hardware processor may include multiple processing cores in one or more embodiments of the invention. In general, the CPU is any physical component configured to execute instructions on the device.

In one or more embodiments of the invention, the memory is any type of physical hardware component for storage of data. In one or more embodiments of the invention, the memory may be partitioned into separate spaces for virtual machines. In one or more embodiments, the memory further includes a payload for transmitting on the network (140) or received from the network (140) and consumed by the CPU.

Continuing with FIG. 1, in one or more embodiments of the invention, the communication adapter (e.g., transmitting communication adapter (102a), responder communication adapter (102b)) is a physical hardware component configured to connect the corresponding device to the network (140). Specifically, the communication adapter is a hardware interface component between the corresponding device and the network. In one or more embodiments of the invention, the communication adapter is connected to the corresponding device using a peripheral component interconnect (PCI) express connection or another connection mechanism. For example, the communication adapter may correspond to a network interface card, an Infiniband® channel adapter (e.g., target channel adapter, host channel adapter), or any other interface component for connecting the device to the network. In one or more embodiments of the invention, the communication adapter includes logic (e.g., transmitting processing logic (104a), responder processing logic (104b)) for performing the role of the communication adapter with respect to the message. Specifically, the transmitting communication adapter (102a) includes transmitting processing logic (104a) and the responder communication adapter (102b) includes responder processing logic (104b) in one or more embodiments of the invention. Although not shown in FIG. 1, the transmitting communication adapter (102a) and/or responder communication adapter (102b) may also include responder processing logic and transmitting processing logic, respectively, without departing from the scope of the invention. The transmitting processing logic (104a) and the responder processing logic (104b) are discussed below.

In one or more embodiments of the invention, the transmitting processing logic (104a) is hardware or firmware that includes functionality to receive the payload from the transmitting device (101a), partition the payload into packets with header information, and transmit the packets via the network port (126a) on the network (140). Further, in one or more embodiments of the invention, the transmitting processing logic (104a) includes functionality to determine whether an acknowledgement is not received for a packet or when an error message is received for a packet and, in such cases, to subsequently retransmit the packet. By way of an example, the transmitting processing logic for an Infiniband® network is discussed in further detail in FIG. 2 below.

Continuing with FIG. 1, as discussed above, packets are sent to, and received from, a responder node (100b). A responder node (100b) may correspond to a second host system in the Infiniband® network. Alternatively or additionally, the responder node (100b) may correspond to a data storage device used by the host to store and receive data.

In one or more embodiments of the invention, the responder node includes a responder communication adapter (102b) that includes responder processing logic (104b). Responder processing logic (104b) is hardware or firmware that includes functionality to receive the packets via the network (140) and the network port (126b) from the transmitting node (100a) and forward the packets to the responder device (101b). The responder processing logic (104b) may include functionality receive packets for a message from network (140). The responder processing logic may further include functionality to transmit an acknowledgement when a packet is successfully received. In one or more embodiments of the invention, the responder node may only transmit an acknowledgement when the communication channel, the packet, or the particular message of which the packet is a part requires an acknowledgement. For example, the communication channel may be in a reliable transmission mode or an unreliable transmission mode. In the reliable transmission mode, an acknowledgement is sent for each packet received. In the unreliable transmission mode, an acknowledgement is not sent.

The responder processing logic (104b) may further include functionality to send an error message if the packet is not successfully received or cannot be processed. The error message may include an instruction to retry sending the message after a predefined period of time. The responder processing logic (104b) may include functionality to perform similar steps described in FIG. 3 to define the predefined period of time using an exponential timeout formula.

Alternatively, the responder processing logic (104b) may transmit packets to the responder device (101b) as packets are being received. By way of an example, the responder processing logic for an Infiniband® network is discussed in further detail in FIG. 2 below.

Although not described in FIG. 1, software instructions to perform embodiments of the invention may be stored on a non-transitory computer readable medium such as a compact disc (CD), a diskette, a tape, or any other computer readable storage device. For example, the transmitting processing logic and/or the responder processing logic may be, in whole or in part, stored as software instructions on the non-transitory computer readable medium. Alternatively or additionally, the transmitting processing logic and/or receiving processing logic may be implemented in hardware and/or firmware.

Figure 2:
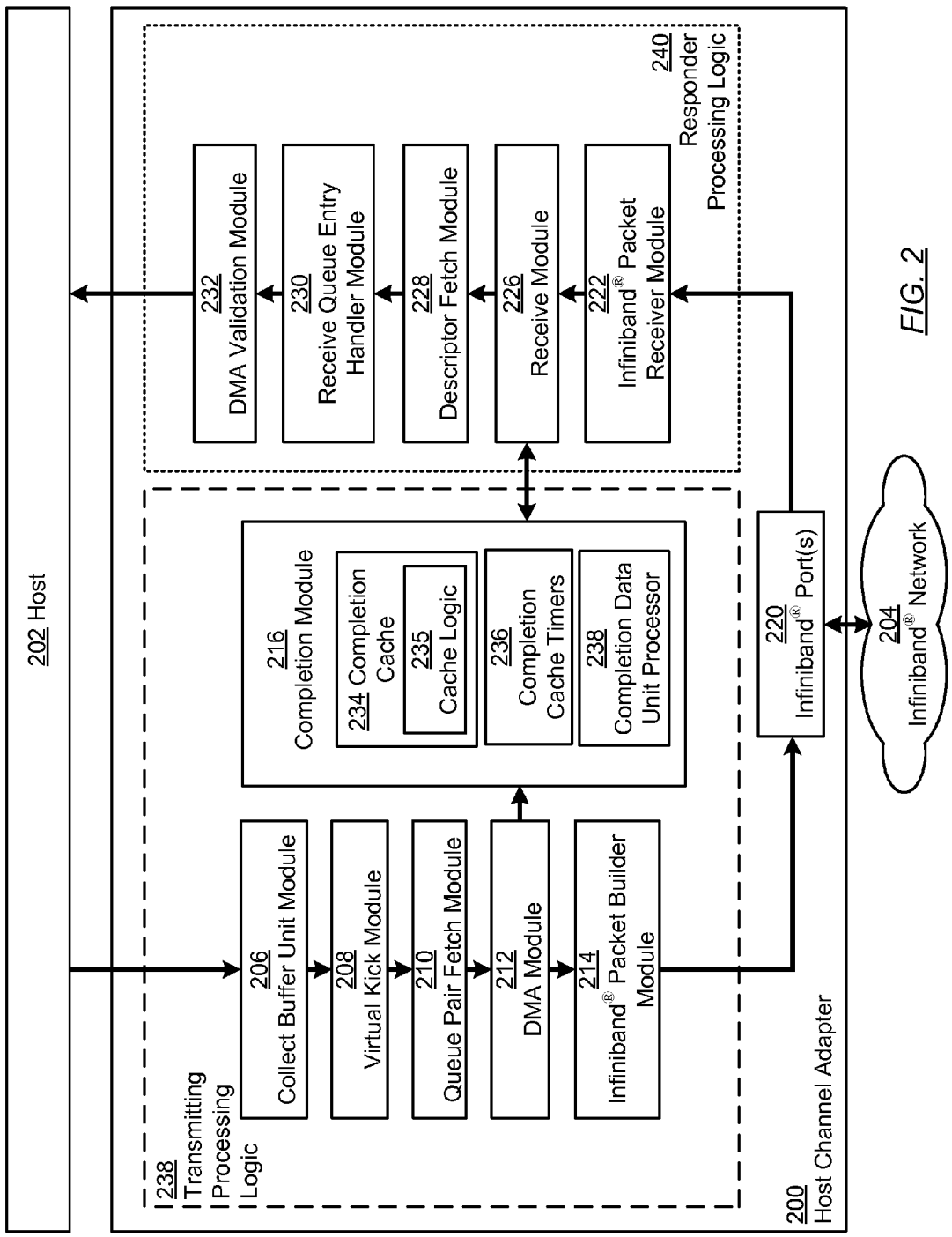

As discussed above, FIG. 1 shows a general communication system for transmitting and responder messages. FIG. 2 shows a schematic diagram of a communication adapter when the communication adapter is a host channel adapter (200) and the network is an Infiniband® network in one or more embodiments of the invention. That is, FIG. 2 applies in the scenario where both the transmitting node and the responder node implement a host channel adapter (200).

As shown in FIG. 2, the host channel adapter (200) may include a collect buffer unit module (206), a virtual kick module (208), a queue pair fetch module (210), a direct memory access (DMA) module (212), an Infiniband® packet builder module (214), one or more Infiniband® ports (220), a completion module (216), an Infiniband® packet receiver module (222), a receive module (226), a descriptor fetch module (228), a receive queue entry handler module (230), and a DMA validation module (232). In the host channel adapter of FIG. 2, the host channel adapter includes both transmitting processing logic (238) for sending messages on the Infiniband® network (204) and responder processing logic (240) for responder messages from the Infiniband® network (204). In one or more embodiments of the invention, the collect buffer unit module (206), virtual kick module (208), queue pair fetch module (210), direct memory access (DMA) module (212), Infiniband® packet builder module (214), and completion module (216) may be components of the transmitting processing logic (238). The Infiniband® packet receiver module (222), receive module (226), descriptor fetch module (228), receive queue entry handler module (230), and DMA validation module (232) may be components of the responder processing logic (240). As shown, the completion module (216) may be considered a component of both the transmitting processing logic (238) and the responder processing logic (240) in one or more embodiments of the invention.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message. Moreover, for purposes of embodiments of the present invention, the term "message" is synonymous with both "work request" and "original work request." Specifically, an original work request is sent from a software application executing on the host (202). Accordingly, in embodiments of the invention, an original work request refers to a request which a send queue of a queue pair (QP) issues to a remote receive queue of the same QP on a responder node.

Infiniband® supports two basic forms of work requests: sends and RDMAs. A send is sending a message containing data from the sender to the receiver, where the receiver delivers the data to a locally managed receive queue. RDMAs are operations whereby the requester specifies the remote memory address on which the request will operate. RDMAs may be RDMA reads, RDMA writes, and atomic operations (discussed further below).

Referring to FIG. 2, the dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer controller module (206) includes functionality to receive command data from the host and store the command data on the host channel adapter. Specifically, the collect buffer controller module (206) is connected to the host and configured to receive the command from the host and store the command in a buffer. When the command is received, the collect buffer controller module is configured to issue a kick that indicates that the command is received.

In one or more embodiments of the invention, the virtual kick module (208) includes functionality to load balance commands received from applications. Specifically, the virtual kick module is configured to initiate execution of commands through the remainder of the transmitting processing logic (238) in accordance with a load balancing protocol.

In one or more embodiments of the invention, the queue pair fetch module (210) includes functionality to obtain queue pair status information for the QP corresponding to the data unit. Specifically, per the Infiniband® protocol, the original work request has a corresponding send queue and a receive queue in main memory in the host (202). The send queue and receive queue form a QP. Accordingly, the QP corresponding to the original work request is the QP corresponding to the data unit in one or more embodiments of the invention. More specifically, a work request is committed to a send queue in host memory before being transmitted to the HCA (200). There may be multiple send queues and multiple corresponding receive queues in the host memory of both transmitting and responder nodes. The queue pair state information may include, for example, sequence number, address of remote receive queue/send queue, whether the QP is allowed to send or allowed to receive, and other state information.

In one or more embodiments of the invention, the DMA module (212) includes functionality to perform DMA with host memory. The DMA module may include functionality to determine whether a command in a data unit or referenced by a data unit identifies a location in host memory that includes payload. The DMA module may further include functionality to validate that the process sending the command has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each data unit and to initiate transmission of the one or more packets on the Infiniband® network (204) via the Infiniband® port(s) (220). In one or more embodiments of the invention, the Infiniband® packet builder module may include functionality to obtain the payload from a buffer corresponding to the data unit, from the host memory, and/or from an embedded processor subsystem memory.

The completion module (216) includes functionality to manage packets for QPs set in reliable transmission mode. Specifically, in one or more embodiments of the invention, when a QP is in a reliable transmission mode, then the responder HCA of a new packet responds to the new packet with an acknowledgement message for sends and RDMA writes indicating that transmission was successful, or an error message indicating that transmission failed. In one or more embodiments of the invention, the completion module (216) includes functionality to receive this acknowledgement message from a responder channel adapter and to manage data units corresponding to packets until an acknowledgement is received or transmission is deemed to have failed (e.g., by a timeout). For RDMA reads or atomic operations, a response including data may be sent by the responder node. In this case, the completion module (216) may be configured to receive the response including data.

An acknowledgment message may indicate that a referenced packet associated with a send or RDMA write operation has been received by the responder channel adapter. Further, an acknowledgement message may indicate that data associated with a particular request has been committed to memory on the responder side receive queue of the QP. In one embodiment of the invention, the responder channel adapter may send an error message (i.e., a negative acknowledgement message) that indicates a referenced packet was not properly received (e.g., the received packet was corrupted). In one embodiment of the invention, the negative acknowledgement message may also include other information. This information may include a request to stop transmitting packets, or to wait a specified period of time before resuming transmission.

Those skilled in the art will appreciate that transmissions which do not involve reliable connections do not require such acknowledgement and, thus, do not invoke the completion building process that is the subject of the present disclosure.

In one or more embodiments of the invention, whenever a software application in the host (202) submits a work request, the completion module (216) of the HCA (200) is required to return a completion to the appropriate completion queue (CQ) (not shown) in host memory, notifying the software application that the work request has been executed and of the final status of the work request. For reliable connection transport types, the HCA (200) does not return the completion until the remote node to which the packets were sent has replied with an acknowledgement of successful reception, or until it has determined that an error has occurred and that the work request has failed. In one or more embodiments of the invention, the completion returned to the software application by the HCA (200) contains information about the original work request which was submitted. Thus, for the completion module (216) to build the completion, the completion module (216) waits for the appropriate response to be received from the remote node, and then inspects the original work request to determine that the responses received are adequate (i.e., respond directly to the work request with sufficient information) and complete (i.e., all packets forming the response are present) for the original work request which was submitted.

Specifically, in one or more embodiments of the invention, a completion may be built with one or more of the following pieces of information: the original work request identifier, which may be an 8 byte identifier unique to the work request issued by the software application, a QP number associated with the send/receive QP, the size of the original work request and/or the size of the expected response to the original work request (for RDMA reads, e.g.), the actual operation requested by the software application (RDMA write, RDMA read, atomic operation, etc.), and the status of the work request.

In one or more embodiments of the invention, what constitutes an appropriate response (or a completion response to a work request) from the responder node may vary depending on the type of original work request and the responder node preferences. For example, when the original work request is an RDMA write or a send request, a single work request may be anywhere from zero bytes all the way up to 2 gB. The work requests are then broken up into a number of individual packets by the HCA (200), depending the MTU (Maximum Transfer Unit) of the Infiniband® fabric. In one or more embodiments of the invention, the Infiniband® MTU is set to one of {256 B, 512 B, 1 kB, 2 kB, 4 kB}. Accordingly, a number of packets corresponding to each original work request may be calculated by computing RequestSize/MTU Size. The responder node may only send one acknowledgement for the entire work request. Alternatively, in one or more embodiments of the invention, the responder node may send periodic acknowledgements as the work request proceeds. The periodic responses each acknowledge that portion of the work request which has been successfully received. In one or more embodiments of the invention, regardless of how many acknowledgements the responder node chooses to send, the completion is not be built/written by the completion module (216) until all packets of the original work request are acknowledged.

In the case of RDMA reads, the work request is a single packet which specifies the amount of data which should be read. This may also be from zero bytes up to 2 gB. The response to the work request then includes of multiple packets, again equal to Request Size/MTU Size. In this case also, the Requester side does not build/write the completion until all of the data for the RDMA read is received. RDMA atomic operations are defined by the Infiniband® standard as being exactly eight bytes in length. Thus, for atomic operations, there is exactly one request packet sent and exactly one response packet received. Accordingly, the completion is written by the completion module (216) when the single acknowledgement for an atomic operation is received.

In one or more embodiments of the invention, RDMA reads and atomic operations both require explicit responses which include the data required by the request. Responses to RDMA writes and sends, in contrast, only provide an acknowledgement that the data was received. A by-product of this is that RDMA writes and sends may be "implicitly" acknowledged by the responder node, in one or more embodiments of the invention. For example, consider the scenario in which a requestor sends 2 RDMA writes, with sequence numbers 1 and 2 (i.e., two original work requests which are RDMA writes). In one or more embodiments of the invention, the responder node may choose to coalesce the acknowledgement of these two work requests into a single response. In this case, an acknowledgement may only be sent for work request 2. Because of the ordered nature of Infiniband® QP operations, when the requester sees the acknowledgement for work request 2, the requestor understands that if work request 2 has been responded to, then work request 1 must necessarily have been successful as well. Accordingly, the acknowledgment for work request 2, also serves as an implicit acknowledgement of work request 1.

Continuing with FIG. 2, the completion module (216) is also configured to use contents of the original work request to build the completion entry which is eventually written to the completion queue in host memory. To this end, the completion module (216) includes a completion cache (234), associated completion cache timers (236), and a completion data unit processor (238). Further, although not shown, the completion module (216) may include one or more data structures, such as a hardware linked list queue, for storing a data unit corresponding to packet(s) waiting for an acknowledgement or a failed transmission or waiting for transmission to a next module. Specifically, in one or more embodiments of the invention, a packet may be deemed queued or requeued when a data unit corresponding to the packet is stored in the data structure.

The completion data unit processor (238) includes functionality to determine when an acknowledgement message is received, an error message is received, or a transmission times out. The completion data unit processor further includes functionality to update the corresponding modules (e.g., the DMA module and the collect buffer module) to retransmit the work request or to free resources allocated to the command. In one or more embodiments of the invention, the completion data unit processor (238) also includes functionality to query the completion cache (234) when an acknowledgement or error message is received. More specifically, in one or more embodiments, the completion data unit processor (238) queries the completion cache (234) to determine whether metadata/data for the original work request corresponding to the response received exists in the completion cache (234).

In one or more embodiments of the invention, the completion module (216) is configured to store at least a portion of the original work request in the completion cache (234) on the HCA (200). Specifically, the completion cache (234) may be a 512-entry on-chip cache. The size of the completion cache (234) may vary, depending on typical Infiniband® fabric round trip latencies, and may include extra space to attempt to absorb large reads.

In one or more embodiments of the invention, each entry in the completion cache (234) corresponds to a send queue entry for a work request issued by a software application in the host. Further, each completion cache entry includes relevant original work request metadata for building a completion upon receiving an acknowledgement from a remote responder node. For example, in one or more embodiments of the invention, metadata stored in each completion cache entry may include the OpCode (the operation code that specifies the operation to be performed) of the original work request, an indicator of whether a completion is required for the original work request, an ID of the CQ to which the completion should be written/returned, the length in bytes of the data transfer, and the identifier for the original work request itself. In addition, for RDMA reads, the completion cache (234) may store information about where to place the returned read data in memory. Such information for RDMA reads may, in one or more embodiments, be stored in the form of a 'scatter list' containing a list of addresses and corresponding lengths.

In one or more embodiments of the invention, the completion cache (234) is an optimized, content aware cache which attempts to store the relevant portion of the send queue entry on-chip for as long as possible. Said another way, the completion cache (234) includes cache logic (235) which allows for the completion cache (234) to be intelligent about what content from the original work request in the host memory send queue needs to be stored, and when this content may be evicted. In one or more embodiments of the invention, the cache logic (235) includes eviction mechanism logic, which enables the cache logic (235) to track work requests that have been issued by software applications and predict which work requests may be evicted at the appropriate time.

More specifically, the completion cache (234) is aware of various send queues and aware of the ordering of operations on a send queue. Specifically, work requests in a send queue are consumed in the order in which they appear in the queue, which allows a number of optimizations to be implemented in the completion cache logic (235). In one or more embodiments of the invention, the cache logic (235) is implemented a last-in-first-out (LIFO) algorithm for the eviction mechanism, because based on the structure of the send queues, the oldest entries are expected to be used sooner than the newest entries in the completion cache (234).

For example, when the completion cache logic (235) is forced to evict a completion cache entry, the completion cache logic (235) may first choose to evict a completion cache entry corresponding to a send queue which has not received any response from a responder node for a long period of time. In one or more embodiments of the invention, there may be a predetermined threshold for a period of time beyond which a send queue that has not received a response is deemed to be "stalled." For example, the threshold may be determined by an average round-trip latency of a packet traversing the Infiniband® network fabric. Such a stalled status may indicate that the send queue in question might have experienced an error, and/or that the send queue is less likely to receive any response at all. Within the chosen send queue, the completion cache logic (235) may then also choose an entry which is as far back as possible in the send queue which is affected, knowing that entries further ahead in that queue will necessarily be needed before entries later in the queue.

Further, when receiving responses for a previously stalled send queue, the completion cache logic (235) may aggressively pre-fetch work request metadata for that send queue which was previously evicted. Specifically, in one or more embodiments of the invention, the completion cache logic (235) is configured to intelligently guess that if a previously stalled send queue is now receiving one or more responses, then the send queue has not hit an error and is more likely to continue to make forward progress in the near future. In this case, previously evicted completion cache entries corresponding to such a send queue are aggressively pre-fetched by the completion cache logic (235). This increases the probability that querying the cache for that send queue will result in a cache hit. Thus, in one or more embodiments of the invention, the completion cache (234) does not operate as a standard memory cache, but rather, includes additional logic and functionality to be aware of the structure of the information attempting to be cached.

The completion cache timers (236) may be a programmable set of one or more timers which allow the HCA (200) to guarantee a tenure in the completion cache (234) to a particular work request. Specifically, the completion cache timers (236) are associated with the completion cache eviction mechanism that is part of the completion cache logic (235). The completion cache timer(s) (236) are armed to an expected round trip latency of the Infiniband® network fabric. In one or more embodiments of the invention, the round trip latency is defined as the time it takes for a work request issued by an application to traverse the Infiniband® network fabric, through the transmitting processing logic (238) and through the responder processing logic (240), until an acknowledgement (or error message, as the case may be) is received, by the completion module (216), from the responder node. In one or more embodiments of the invention, this round trip latency may be determined by observance of the time it takes for a work request to travel through the HCA and for HCA to write a completion in the completion queue on the host (202). In alternate embodiments, round trip latency may be calculated as a function of the network size, the network topology, and the nature of the applications using the network. The round trip latency may also vary over time. In one or more embodiments of the invention, a set of counters may track how many cache evictions occur over a particular period of time. The counter values may be used to adjust the timer settings at run time to make the programmed value suit the current network conditions. Those of ordinary skill in the art will appreciate that depending on the size of the cache being used, round trip latency times may be unsupportable. In this case, the mechanism for calculating and using round trip latency times may be turned off entirely, in the interest of preventing the stalling of new outgoing requests.

In one or more embodiments of the invention, the completion cache timers (236) are armed according to the estimated round trip latency calculated using one of the aforementioned methods. In one or more embodiments of the invention, there may be a separate completion cache timer for each completion cache entry associated with an original work request that is sent by an application. Alternatively, there may be a single completion cache timer for each send queue in the host (202), in which case each cache timer may correspond to multiple completion cache entries, all of which correspond to the same send queue in host memory.

In one or more embodiments of the invention, while one or more of the completion cache timers (236) are running, an outgoing work request rate may be throttled to prevent a completion cache overflow. More specifically, the rate at which outgoing work requests are processed by the HCA may be slowed or stalled completely, based on a number of outstanding work requests which have not received responses yet. In one or more embodiments of the invention, there may be a predetermined threshold to determine how many outstanding work requests are acceptable before the outgoing work request rate is throttled. When the completion cache timers (236) expire (or if they are turned off entirely), entries in the completion cache (234) may be evicted and replaced by metadata for new work requests. In one or more embodiments of the invention, the completion cache timers (236) may also allow different quality of service (QoS) to be provided for different QPs by allowing high priority QPs (or certain virtual machines executing on the host with which QPs are associated) to have a longer guaranteed time in the cache.

In one or more embodiments of the invention, the completion module (216) employs a credit scheme, which allows the outgoing request rate to be throttled to avoid premature cache evictions and/or completion cache overruns. Specifically, in one or more embodiments, the cache logic (235) includes logic associated with a credit scheme used for determining when and for how long to throttle an outgoing work request rate. The outgoing work request rate is the rate at which work requests are issued by software applications in the host (202). Because the response time for any given work request (from the remote node) has the potential to be highly variable, e.g., due to congestion at the remote node or in the Infiniband® fabric itself, there may be an arbitrary number of work requests outstanding (awaiting response) from the local HCA at any given time. Further, because hardware resources are limited, the credit scheme serves to artificially limit the number of work requests which may be outstanding at any given time from the HCA such that the completion cache does not overflow (i.e., completion cache entries are not evicted prematurely) while waiting for responses for each outstanding work request.

In one or more embodiments, the credit scheme operates with the use of completion credits. A completion credit represents a guaranteed entry in the completion cache (234) for the amount of time to which the completion cache timer for that entry is armed. Accordingly, each credit of the credit scheme is tied to the completion cache timer for a cached entry. Each work request requires a single completion credit to execute in the HCA pipeline in one or more embodiments of the invention. More specifically, for every work request that is issued, a completion credit is consumed. After a response, such as an acknowledgement, is received, the completion credit is returned to the HCA (200). The HCA (200) throttles the outgoing work request rate based on a number of outstanding credits at any given period of time. In one or more embodiments of the invention, the outgoing request rate may be throttled until the number of outstanding credits is less than a predetermined threshold. In one or more embodiments of the invention, the credits may be stored as part of the completion cache timers (236). Alternatively, the credits may be stored in separate registers (not shown) in the completion module (216) or elsewhere within the HCA (200).

Turning to the responder processing logic (240) of FIG. 2, in one or more embodiments of the invention, the Infiniband® packet receiver module (222) includes functionality to receive packets from the Infiniband® port(s) (220). In one or more embodiments of the invention, the Infiniband® packet receiver module (222) includes functionality to perform a checksum to verify that the packet is correct, parse the headers of the received packets, and place the payload of the packet in memory. In one or more embodiments of the invention, the Infiniband® packet receiver module (222) includes functionality to obtain the queue pair state for each packet from a queue pair state cache. In one or more embodiments of the invention, the Infiniband® packet receiver module includes functionality to transmit a data unit for each packet to the receive module (226) for further processing.

In one or more embodiments of the invention, the receive module (226) includes functionality to validate the queue pair state obtained for the packet. The receive module (226) includes functionality to determine whether the packet should be accepted for processing. In one or more embodiments of the invention, if the packet corresponds to an acknowledgement or an error message for a packet sent by the host channel adapter (200), the receive module includes functionality to update the completion module (216). In one or more embodiments of the invention, the receive module (226) may also include functionality to cache at least a portion of an original work request in the completion cache (235) of the completion module (216).

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA between the host channel adapter and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

Figure 3:
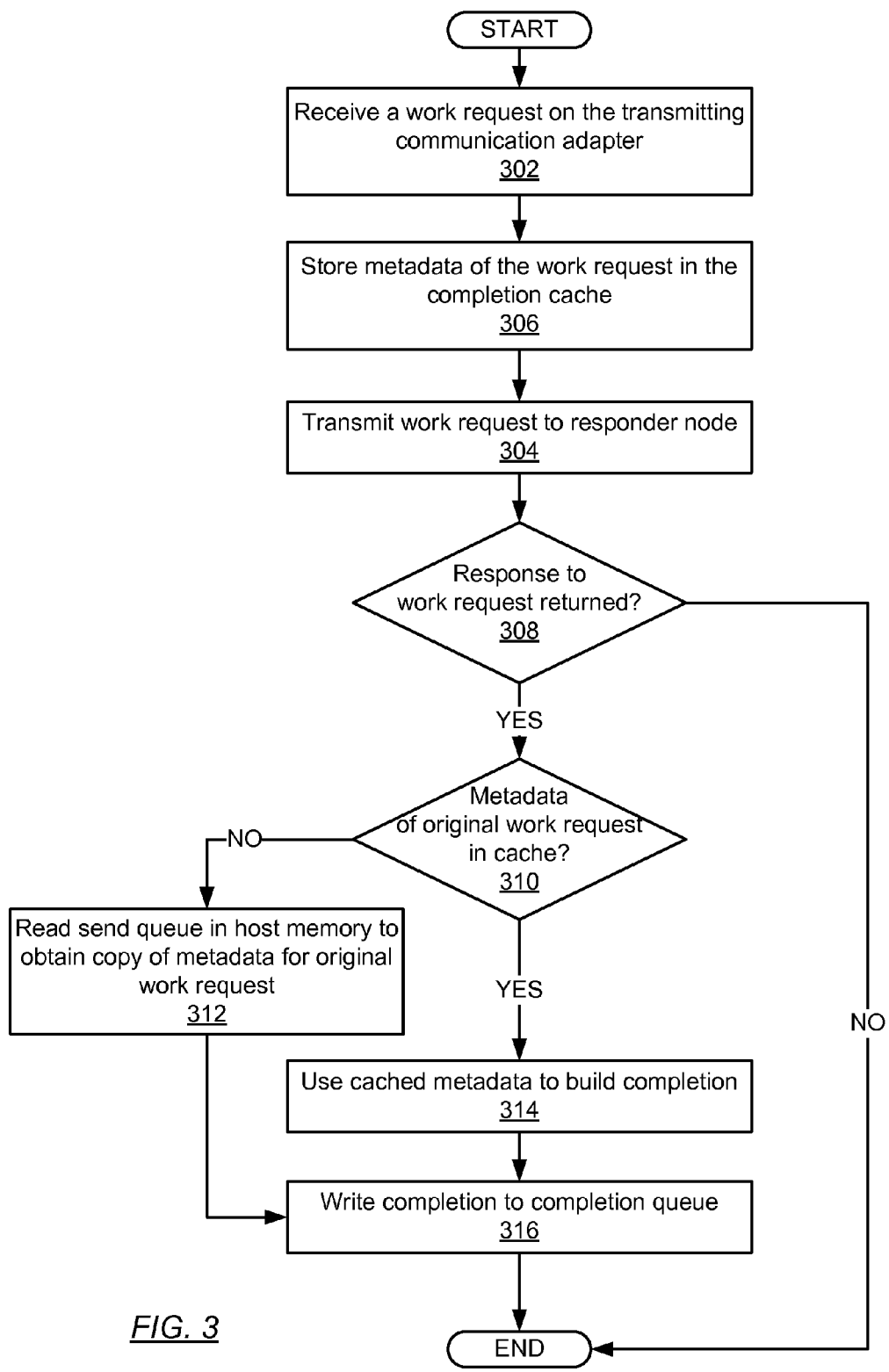
FIGS. 3-4 show flowcharts in one or more embodiments of the invention.

FIG. 3 shows a flowchart of a method for optimizing completion building in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 3, may be included in performing this method. Accordingly, the specific arrangement of steps shown in FIG. 3 should not be construed as limiting the scope of the invention.

In Step 302, a work request is received on the transmitting communication adapter. More specifically, an original work request is issued, from a software application executing on the host system, to the transmitting communication adapter, which may be an Infiniband® HCA having transmitting processing logic (see e.g., FIG. 2). In one or more embodiments of the invention, all outgoing work requests received by a transmitting communication adapter may be on a reliable QP connection. In ST 304, metadata of the original work request is stored in an on-chip completion cache. In one or more embodiments of the invention, at least a portion of all outgoing work requests using reliable QP connections are stored in the completion cache. More specifically, the transmitting processing logic caches at least a portion of the work request while processing the work request for transmission. This portion of each work request stored in the completion cache may be only metadata, metadata and data, or the entire work request. In one or more embodiments of the invention, metadata cached may include an identifier of the work request, send queue information of the work request, destination information of the work request, and/or an other suitable information required to build a completion for the work request.

The original work request is subsequently transmitted, by the transmitting communication adapter, to a responder communication adapter on a responder node (ST 306). Specifically, the original work request may be transmitted in the form of one or more packets that are formatted in accordance with the specifications of the Infiniband® network. The responder node may be a remote node or a local node. In one or more embodiments of the invention, the responder communication adapter may also be an Infiniband® HCA having responder processing logic. Further, as described above, a work request may be a Send or an RDMA operation. RDMA operations may be RDMA writes, RDMA reads, or atomic operations.

At ST 308, a determination is made as to whether a response to the work request has been returned. A response may be an acknowledgement for reliable connection QPs, or an error message of any type. Those of ordinary skill in the art will appreciate that the completion module in the HCA may not receive an response/acknowledgement for a transmitted packet. This may occur, for example, when one or more packets associated with a work request is lost during transmission across the Infiniband® network, or when the destination responder has failed. In these cases, the packet may be retransmitted after a timeout period, during which time the point of transmission failure may have been resolved and the completion building process resumes upon successful retransmission. Alternatively, retransmission may also be unsuccessful. In either, if a response to the original work request is not received, the process of FIG. 3 ends, as no completion is built in such a scenario.

When a response to the work request is received, the completion cache is first queried to check whether the data/metadata associated with the original work request is still present in the cache (ST 310). In one or more embodiments of the invention, a work request may be present if the completion cache timer associated with the work request has not expired. If the work request metadata is not present in the cache, i.e., when a cache miss occurs, then the necessary original work request data may be read from the second queue in host memory (ST 312). This may occur, for example, when the completion cache timer for the original work request has expired, and the completion cache has evicted the entry for the work request as a result of the timer expiration. In another example, an entry associated with a work request may not be present in the cache because the work request experienced a timeout or did not receive a response in ST 308.

When the metadata associated with the original work request is present in the completion cache, the cached metadata is obtained and used by the HCA to build a completion for the original work request (ST 314). A completion includes relevant work request information that is used to inform the software application or user of the software application that issued the work request of the completion status of the work request. Specifically, building a completion may involve gathering the relevant information for information the software application whether the work request was carried out successfully, and writing, to the appropriate send queue in host memory, the completion data for each work request that is issued. Further, building a completion may also involve performing one or more checks or comparisons to ensure that the right amount of data and the correct data is returned for each issued work request. In one or more embodiments of the invention, the relevant information used to build a completion may include, but is not limited to, the status of the original work request (e.g., completed, failed, error, stalled), one or more operations performed in response to the original work request, the work request identifier, the size of the response to the original work request, the For example, if the original work request corresponds to a RDMA read, then the completion module would check that the correct number of packets corresponding to the size of the read request has been returned from the responder. Alternatively, if the original work request is a write operation broken up into a plurality of packets, then completion module may check to ensure than an acknowledgment has been received for the entire write operation, and not only a portion of the write operation. The aforementioned checks may be performed after obtaining metadata for building the completion from the cache in ST 310. Alternatively, the checks may be performed when receiving a response to the work request in ST 308. In either case, the checks are performed in order to gather the necessary information for building a completion. Upon performing the necessary checks to ensure that the response(s) received are adequate, the completion that is built by the HCA is subsequently written to a completion queue (CQ) in the host memory (ST 316).

Figure 4:
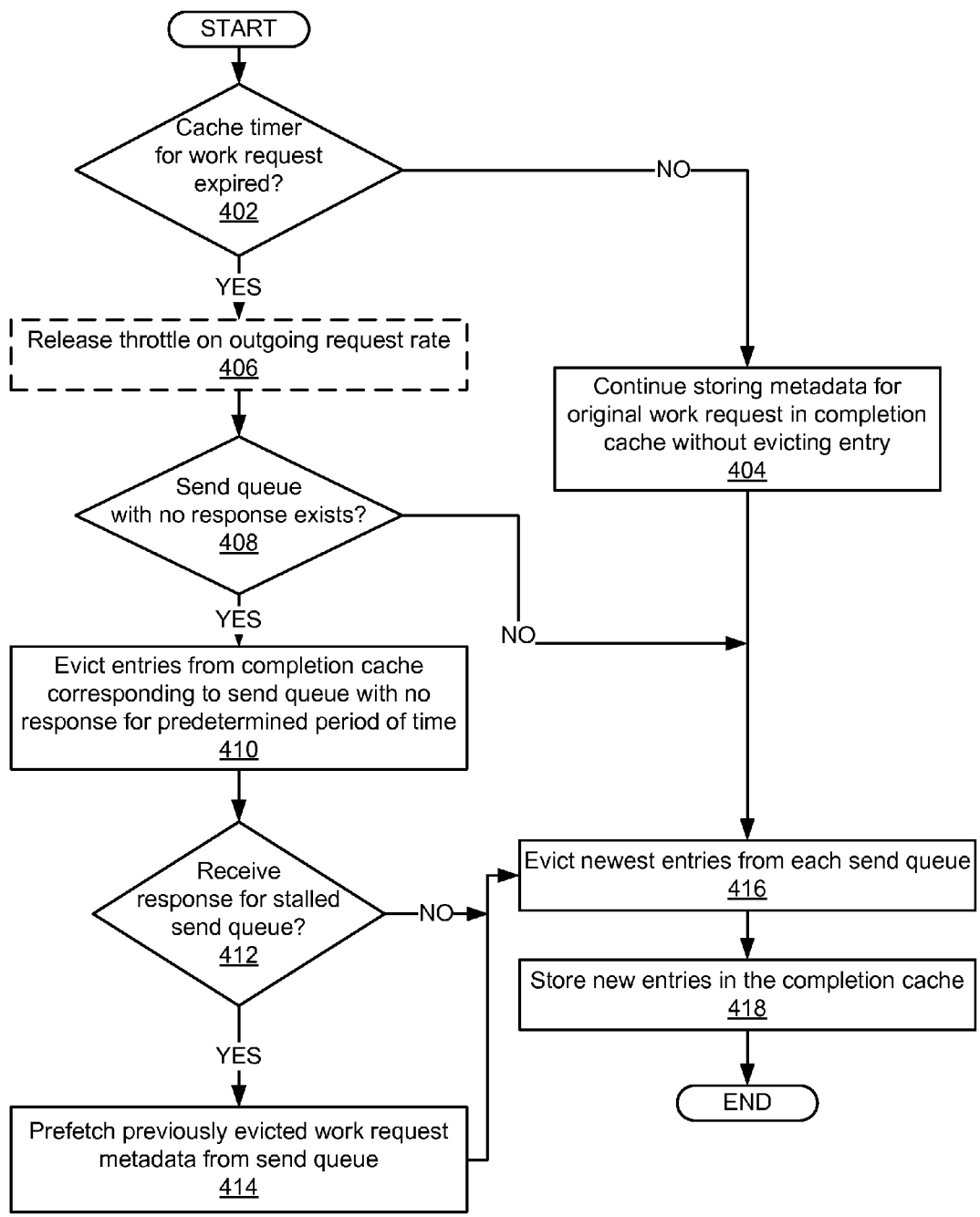

FIG. 4 shows a flow chart for operation of the completion cache eviction mechanism in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention. The following example is provided for exemplary purposes only and accordingly should not be construed as limiting the invention.

In one or more embodiments of the invention, the cache eviction mechanism employed by the completion cache logic is an intelligent mechanism that is meant to substantially increase the likelihood of a cache hit when a response for a particular original work request is received by the completion module. Accordingly, various steps are taken in the process of FIG. 4 to guarantee that only very stale completion cache entries or those which are likely to have errors/problems with responses from a responder node are evicted. Initially, a determination is made as to whether a completion cache timer for a completion cache entry associated with a particular original work request has expired (ST 402). As described above, in one or more embodiments of the invention, completion cache timer(s) may be associated with each completion cache entry. If the completion cache timer for a completion cache entry has not expired, then the metadata and/or data associated with the work request continues to remain stored in the completion cache (ST 404). In one or more embodiments of the invention, when a completion cache timer is associated with multiple completion cache entries corresponding to a single send queue, the determination of ST 402 may be as to whether a completion cache timer for a particular send queue has expired. If the completion cache timer has not expired, all completion cache entries for the send queue remain cached.

Those skilled in the art, having benefit of this disclosure, will appreciate that when a response to a particular work request is received (e.g., an acknowledgement), the completion cache entry for that particular work request may be evicted without regard to the completion cache timers for that entry.

When the completion cache timer for a particular work request or a send queue has expired, the throttle on the outgoing work request rate may be released (ST 406). Specifically, the outgoing work request rate may be stalled by the HCA after a predetermined number of outgoing work requests have been issued. Stalling the outgoing work request rate may involve stopping all work requests from being processed by the HCA. Alternatively, ST 406 may involve slowing down the number of work requests that are processed by the HCA. This determination to stall the outgoing work request rate and the corresponding threshold of a predetermined number of work requests issued may be decided, in one or more embodiments of the invention, based on the credit scheme employed by the HCA. As described above, each work request consumes a single credit in the credit scheme employed by the HCA for completion building. Thus, for example, in one or more embodiments of the invention, when a predetermined number of credits is issued, or when a predetermined number of outstanding credits remain to be consumed, the outgoing work request rate may be stalled/throttled to prevent completion cache overflow. The predetermined number of outstanding credits at which the work request rate is stalled may be determined by, among other parameters, the size of the completion cache, the calculated round trip latency times for responses to be received, and the number of outgoing work requests that are being issued by host applications. Accordingly, ST 406 is optional (as indicated by the dotted lines), because if the outgoing work request rate has been stalled, then outgoing work requests may resume when one or more completion cache timers expire, because the cache logic predicts that the expiration of one or more completion cache timers results in completion cache entries being evicted thereafter.

Next, a determination is made as to whether one or more send queues exist which have not received a response from the responder node (ST 408). More specifically, the cache logic determines whether there is a send queue in host memory that has outstanding work requests for which no acknowledgement or error message has been received, even after expiration of the associated completion cache timer(s) plus some predetermined time thereafter. In this case, in one or more embodiments, the cache logic determines that the send queue(s) is stalled, i.e., unlikely to receive a response based on a predetermined period of time has elapsed. If there is such a send queue which is still awaiting a response, then the cache logic beings to evict completion cache entries which correspond to such a stalled send queue (ST 410).

If no such send queue exists, or after entries corresponding to a stalled send queue are evicted, the next set of entries which are evicted are the newest entries from various send queues (ST 416). In one or more embodiments of the invention, the process of FIG. 4 may also move from ST 404 to ST 416, where if none of the completion cache timer(s) have expired and eviction is necessary due to a large amount of time that the outgoing work request rate has been throttled, entries corresponding to the newest positions in send queues begin to be evicted. This is because in the way in which send queues operate, if and when a send queue receives a response, the response is associated with the oldest entry in the send queue, and not the most recent send queue entries. Accordingly, completion cache entries corresponding to the more recent send queue entries will necessary be needed for completion building only after the completion cache entries corresponding to the oldest send queue entries. As completion cache entries are evicted, new completion cache entries including metadata corresponding to new original work requests may be stored in the completion cache (ST 418).

In one or more embodiments of the invention, the completion cache logic is also configured to prefetch evicted entries intelligently. For example, consider the scenario in which the cache eviction mechanism evicts entries corresponding to a particular send queue that has not received a response for a long period of time (e.g., ST 410). In this case, one or more of the newest entries corresponding to that send queue may be evicted. However, suppose then that the send queue suddenly begins to receive responses (ST 412). In this case, the cache logic is aware that the particular send queue has started receiving responses starting with the oldest in the send queue. Accordingly, previously evicted newer entries may be prefetched from the send queue in main memory by the cache logic (ST 414). This allows for the cache logic to optimize the completion building process for the most recent responses being received by the HCA. In this way, by the time the responses for the newer evicted entries come into the completion module, the metadata necessary to build the completions will again be present in the completion cache. From ST 414, the eviction mechanism continues with evictions of newest entries from various send queues (ST 416) and storing of new entries in the completion cache (ST 418).

Those skilled in the art will appreciate that FIG. 4 may be repeated for each completion cache entry. Thus, although the above process describes the eviction of completion cache entries associated with a single work request, the process described above may be applied to one or more completion cache entries associated with each work request that is issued by a host application. In one or more embodiments, a responder may send a single response/acknowledgement for multiple work requests, in which case completion cache entries associated with the multiple work requests may be evicted for a single response received from a responder node.

Figure 5:
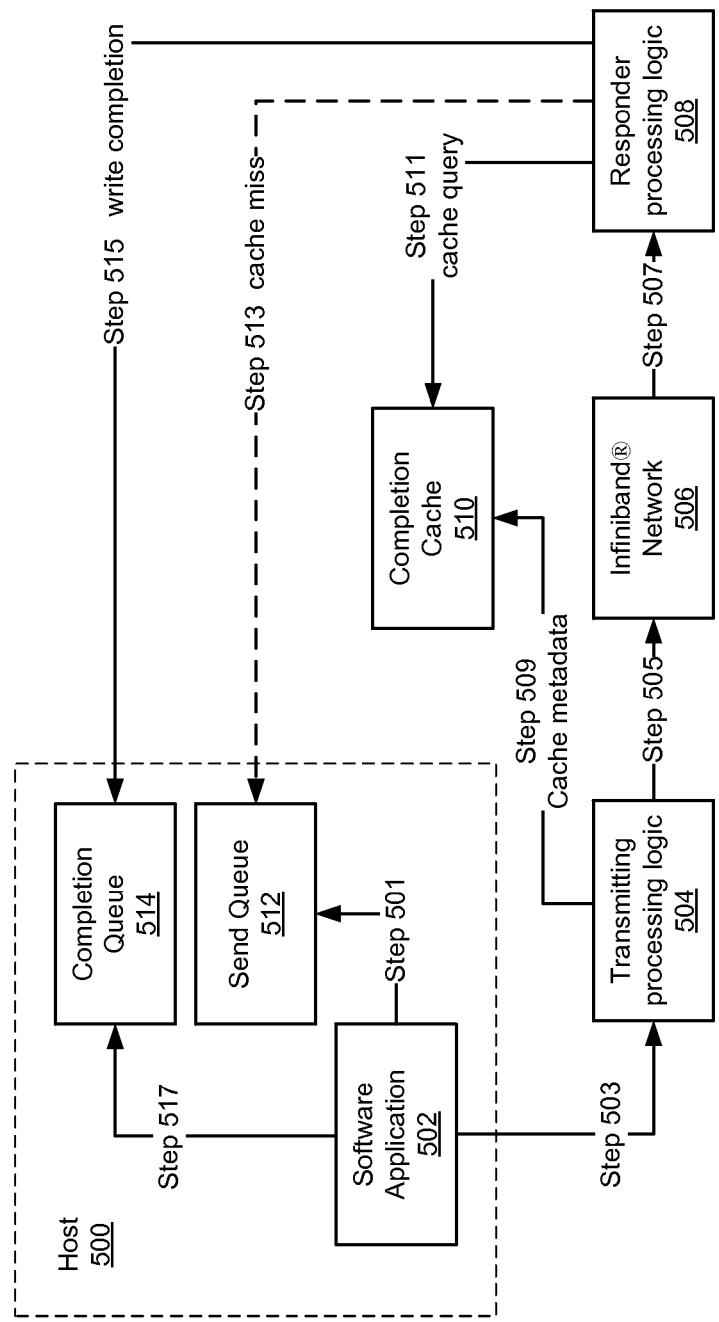
FIG. 5 shows an example flow diagram in one or more embodiments of the invention.

FIG. 5 shows a flow diagram in accordance with one or more embodiments of the invention. In one or more embodiments of the invention, FIG. 5 shows the various components which interact to perform optimal completion building in accordance with embodiments of the invention. Initially, a work request is issued by a software application (502) executing on the host system (500). The work request may be a simple send transmission, a RDMA write operation, an RDMA read request, and/or an atomic operation. In Step 501, the work request is committed to memory on the transmitting node side in a send queue (512) of a send/receive queue pair (QP). Those skilled in the art, having benefit of this disclosure, will appreciate that while only a single send queue is shown in FIG. 5, there may be multiple QPs, resulting in a plurality of send queues in the transmitting node, and a plurality of corresponding receive queues (not shown) in the responder node. The work request is then received by transmitting processing logic of an HCA (504) (Step 503). In the flow diagram of FIG. 5, one or more communications between the transmitting processing logic of the HCA (504) and the responder processing logic of the HCA (508) are performed over the Infiniband® network (506). Furthermore, the Infiniband® network (506) supports reliable connections between the transmitting node and the responder node.

The transmitting processing logic (504) divides the work request into one or more packets and transmits the packets over the Infiniband® network (Step 505). In one or more embodiments of the invention, before transmitting the packets, the transmitting processing logic may store a portion of the work request (e.g., the relevant metadata of the work request) in the completion cache (ST 509). More specifically, as the transmitting processing logic prepares the work request for subsequent transmission, the transmitting processing logic causes at least a portion of the work request to be cached in the completion cache. Subsequently, the one or more packets is received, via the Infiniband® network (506), by the responder processing logic of the HCA (Step 507).

The responder processing logic (508) then processes the work request and performs the actions/operations required by the work request. Subsequently, the responder processing logic transmits a response (an acknowledgement or an error message) over the Infiniband® network (506). This response is received by the completion module (not shown) which is positioned between the transmitting processing logic (504) and the responder processing logic (508) in the Infiniband® HCA. Subsequently, the completion cache (510) is queried, by the responder processing logic (508), to obtain the metadata required to build a completion for the work request based on the response received (Step 511). Optionally, if the query to the cache results in a cache miss, the completion module performs a read operation in the send queue (512) from which the work request originated (Step 513). Subsequently, upon building the completion with the required data, the completion module writes the completion to a completion queue (514) in the main memory on the host (500) (Step 515). Finally, the completion queue (514) is accessed by the software application (502) to obtain the status of the original work request (Step 217).

In one or more embodiments of the invention, by caching a portion of the original work request on chip in the HCA, an additional memory read of the send queue in host memory which would normally be performed to build a completion for the work request is eliminated. Further, by using a content aware eviction mechanism, the likelihood of getting a hit in the cache is maximized, thereby reducing latency on building completion responses which in turn contributes to increased overall throughput. Completion cache timers which track expected round trip latency of the Infiniband® fabric may be adjusted and reprogrammed based on observed latencies over a period of time, thereby further optimizing the cache. Further, the credit scheme serves as a means of guaranteeing a cache entry for a programmable period of time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completion building, the method comprising:
   receiving a work request by a host channel adapter (HCA);
   caching a portion of the work request in a completion cache in the HCA, wherein the cached portion of the work request comprises information for building a completion for the work request;
   receiving, by the HCA, a response to the work request;
   querying the completion cache upon receiving the response to the work request to obtain the cached portion of the work request; and
   building the completion for the work request using the cached portion of the work request, wherein the completion informs a software application of at least a status of the work request as executed by the HCA.

2. The method of claim 1, further comprising:
   arming a completion cache timer corresponding to the cached portion of the work request, wherein the completion cache timer comprises a length of time that the cached portion of the work request remains cached; and
   evicting a cache entry corresponding to the work request when the completion cache timer expires.

3. The method of claim 2, wherein the work request and the response to the work request are transmitted over an Infiniband® network fabric.

4. The method of claim 3, wherein the length of time is equal to or greater than a round trip latency of the Infiniband® network fabric.

5. The method of claim 2, wherein:
   The completion cache timer comprises a credit associated with the cached portion of the work request, wherein the credit remains outstanding until the work request is processed and the response to the work request is received by the HCA, and
   when a number of outstanding credits is higher than a predetermined threshold, an outgoing work request rate is throttled.

6. The method of claim 1, further comprising:
   issuing the work request by the software application; and committing the work request to a send queue in a host operatively connected to the HCA prior to transmission of the work request to the HCA.

7. The method of claim 6, wherein the completion cache comprises cache logic configured to:
determine that the send queue is stalled after the completion cache timer expires;
evict cached entries for the stalled send queue corresponding to the most recent send queue entries, wherein cached entries for the stalled send queue comprises the cached portion of the work request; and
prefetch the evicted cache entries for the stalled send queue when the stalled send queue begins receiving responses from the HCA corresponding to the oldest send queue entries.

8. The method of claim 1, further comprising:
executing the work request, by the HCA, to generate the response to the work request.

9. The method of claim 1, wherein the work request comprises one selected from the group consisting of a send, a RDMA write, RDMA read, and an atomic operation, and wherein the portion of the work request comprises metadata of the work request comprising at least one selected from a group consisting of: an identifier for the work request, an OpCode of the work request, an identifier of a completion queue to which the completion for the work request is written, a location for placing read data for an RDMA read, and a length of a data transfer associated with the work request.

10. The method of claim 1, further comprising:
writing, by the HCA, the completion to a completion queue in the host, wherein the completion is used by the software application to determine the status of the work request.

11. The method of claim 1, wherein the response is an acknowledgement message acknowledging that the work request has been processed successfully, the method further comprising:
dividing, by the HCA, the work request into a plurality of packets, wherein the acknowledgement message is sent for each of the plurality of packets; and
building the completion using the cached portion of the work request only upon receiving all acknowledgement messages corresponding to the work request.

12. A host communication adapter (HCA) comprising:
transmitting processing logic configured to:
transmit a work request issued by a software application executing on a host operatively connected to the HCA; and
cache a portion of the work request in a completion cache, wherein the cached portion of the work request comprises information for building a completion for the work request;
responder processing logic configured to:
receive the work request from the transmitting processing logic; and
generate a response to the work request; and
a completion module configured to:
receive the response to the work request from the responder processing logic; and
build the completion for the work request, wherein the completion informs the software application of at least a status of the work request as executed by the HCA.

13. The host communication adapter of claim 12, wherein the completion cache comprises cache logic configured to:
arm a completion cache timer corresponding to the cached portion of the work request, wherein the completion cache timer comprises a length of time that the cached portion of the work request remains cached; and
evict a cache entry corresponding to the work request when the completion cache timer expires.

14. The host communication adapter of claim 13, wherein the length of time is equal to or greater than a round trip latency of the Infiniband® network fabric.

15. The host communication adapter of claim 13, wherein the completion cache timer comprises a credit associated with the cached portion of the work request, wherein the credit remains outstanding until the work request is processed and the response to the work request is received by the HCA, and
when a number of outstanding credits is higher than a predetermined threshold, an outgoing work request rate is throttled.

16. The host communication adapter of claim 12, wherein the host is configured to:
commit the work request to a send queue in the host prior to transmission of the work request to the HCA,
wherein the cached portion of the work request corresponds to an entry in the send queue of the committed work request.

17. The host communication adapter of claim 12, wherein the work request comprises one selected from the group consisting of a send, a RDMA write, RDMA read, and an atomic operation, and wherein the portion of the work request comprises metadata of the work request comprising at least one selected from a group consisting of: an identifier for the work request, an OpCode of the work request, an identifier of a completion queue to which the completion for the work request is written, a location for placing read data for an RDMA read, and a length of a data transfer associated with the work request.

18. A system, comprising:
a host executing a software application, wherein the software application is configured to issue a work request; and
a host communication adapter (HCA) operatively connected to the host and configured to:
receive the work request;
cache a portion of the work request in a completion cache in the HCA, wherein the cached portion of the work request comprises information for building a completion for the work request;
process the work request and generate a response to the work request; and
build the completion for the work request using the cached portion of the work request, wherein the completion informs the software application of at least a status of the work request as executed by the HCA.

19. The system of claim 18, the HCA being further configured to:
arm a completion cache timer corresponding to the cached portion of the work request, wherein the completion cache timer comprises a length of time equal to or greater than a round trip latency of the Infiniband® network fabric that the cached portion of the work request remains cached; and
evict a completion cache entry corresponding to the work request when the completion cache timer expires.

20. The system of claim 19, wherein:
The completion cache timer comprises a credit associated with the cached portion of the work request, wherein the credit remains outstanding until the work request is processed and the response to the work request is received by the HCA, and when a number of outstanding credits is higher than a predetermined threshold, an outgoing work request rate is throttled.

* * * * *